Nov. 3, 1936.                A. A. EMLEN                2,059,217
                  BUILT-IN JUNCTION BOX FOR TRANSFORMERS
                        Filed Oct. 26, 1935
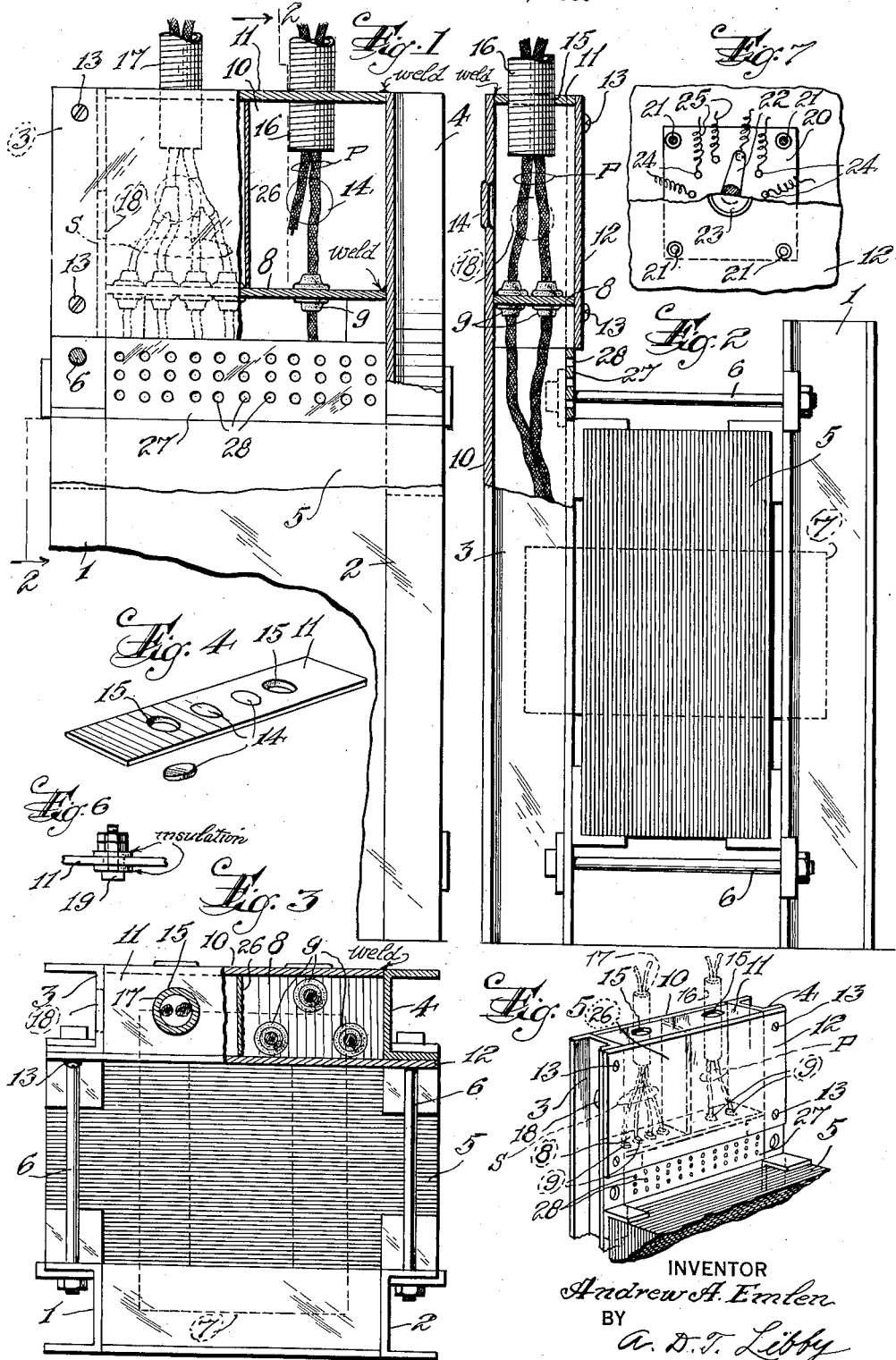
INVENTOR
Andrew A. Emlen
BY
A. D. T. Libby
ATTORNEY Patented Nov. 3, 1936

2,059,217

UNITED STATES PATENT OFFICE 2,059,217

BUILT-IN JUNCTION BOX FOR TRANSFORMERS

Andrew A. Emlen, Roselle, N. J., assignor to American Transformer Company, Newark, N. J.

Application October 26, 1935, Serial No. 46,885

6 Claims. (Cl. 247—1)

This invention relates to improvements in the construction of a transformer, particularly of the air-cooled type.

In making the electrical connections to such a transformer, it has been the usual practice in the past to run the conductors from the transformer to a junction box located a distance and apart from the transformer, and then bring the power supply cables to the junction box for interconnection with the transformer conductors.

It is the principal object of my invention to provide for such a transformer, an integral or built-in junction box, thereby making a neater, safer, easier and all around generally better installation between the power supply cables and the transformer, at the same time reducing the cost of the transformer and separate junction box, all of which advantages will be pointed out in the accompanying specification.

In the drawing:

Figure 1 is a partial front view of a transformer showing my improvement or built-in junction box at the top portion thereof, a part being broken away to show certain of the details.

Figure 2 is a part side-elevation and part-sectional view on the line 2—2 of Figure 1.

Figure 3 is a top view of Figure 1, showing some modification thereof.

Figure 4 is a perspective view of the top closure plate shown in Figure 1.

Figure 5 is a perspective view on a reduced scale of the upper part of the transformer, the view being somewhat similar to that shown in Figure 1.

Figure 6 is a fragmentary view showing a modified form of support plate.

Figure 7 is a fragmentary view showing a further modified arrangement comprising a switch carried on the front closure plate of the junction box.

In the drawing, wherein like numbers refer to corresponding parts in the various views, 1, 2, 3, and 4 are channels comprising frame members for supporting the core 5 made up of the usual type of laminations of magnetic material. The channel members 1, 2, 3, and 4 are held together by a plurality of bolts 6. The primary and secondary windings are illustrated collectively by coil 7 carried by the core 5.

To incorporate my improved form of construction, I have extended the back channel members 3 and 4 a suitable distance at the top. Between these channel members, and fastened thereto in any satisfactory manner, as by welding, is a metal support plate 8 provided with grommets or suitable insulators 9 through which the conductors from the coil winding 7 extend. As shown in Figures 1 and 5, two wires P lead to the primary winding of the transformer, while four windings S lead to the secondary of the transformer, it being understood that in the illustration, the secondary is composed of two coils with their ends brought out so that they may be connected in series or parallel, depending on the voltage desired from the transformer.

Extending between and at the back edge of the channel members 3 and 4, is a closure plate 10 which runs the full length of the channels 3 and 4, including the extensions. The plate 10 is fastened to the channels 3 and 4 in any satisfactory manner as by welding. Across the top of the channel members 3 and 4, is a top closure plate 11. This may also be fastened in position as by welding. Across the front side of the extensions of the members 3 and 4, is a closure plate 12, the same being removably held in place as by screws 13, thus completing the box or enclosure about the support plate 8 and the conductors and/or cables leading thereto or therethrough.

In order to permit the incoming and outgoing cables to enter the junction box, I have provided the top member with a plurality of "knock-out" discs or devices 14 to provide the necessary openings 15 for the necessary cables 16 or 17. It will be understood that before the top closure plate 11 is put in place, the portions 14 are operated on by a punch to merely punch these portions out so that they may be readily "knocked" out with a hammer, depending upon the number of orifices required. As shown in Figure 4, two holes 15 are provided which are all that are necessary to accommodate the two cables 16 and 17 shown in Figure 1. If it is more convenient or desirable to bring the cables through from the rear, similar portions 14 may be formed in the rear closure plate 8 before it is welded in place. If it is desired to bring the cables in through the side, the channel members 3 and 4 may be provided with holes 18 which would probably be drilled therein on account of the usual extra thickness of the channel members 3 and 4, and then these holes are plugged in any satisfactory manner as by "tacking", with an electric arc, metallic discs similar to 14 in the holes 18, whereby the discs may be readily "knocked" out to accommodate the cables. It is to be understood, however, that only the necessary number of discs 14 are "knocked" out to accommodate the required cables, so that the junction box is substantially closed.

As shown in Figure 1, the primary cable 16 includes two conductors which, as has been described, are adapted to be connected to the primary wires P going to the transformer. The cable 17 is also shown as composed of two conductors which are connected in multiple with the ends of the two coils of the secondary of the transformer. In making these connections, the cables 16 and 17 are passed through the hole 15 provided for them, for example, in the top plate 11, it being assumed that the plate 12 is removed whereby the ends of the transformer conductors P and S, after passing through the insulators 9, can be brought forward out of the junction box and the necessary connections or splices made to the cables 16 and 17, after which they are pushed back in place as indicated in Figure 1, and the cables 16 and 17 are pulled outwardly and fastened, if it is desired to take up slack, after which the plate 12 is put in position, thereby closing the junction box.

As shown in Figure 6, the support plate 8 may have a plurality of studs 19 insulatingly mounted thereon, to which the transformer conductors P and S, and likewise the incoming cables, may be attached. Thus the support plate 8 may also act as a connecting rack and it is to be understood that the manner of connection or type of binding post may be anything desired other than that shown in Figure 6.

A further modification is indicated in Figure 7, in which the removable plate 12 carries a switch 20 by means of studs 21. A switch lever 22 is operated by a handle 23 positioned on the exterior surface of the plate 12. The switch lever 22 is adapted to engage contacts 24 to which are attached taps 25 leading to one of the windings of the transformer, whereby different voltages may be take nfrom the transformer, the connections to the switch lever 22 and to the transformer being omitted for the purpose of clarity.

It may be noted in passing, that the primary and secondary conductors are separated by a seperator plate 26 to conform with the underwriters rules. Also, it may be mentioned that the closure plate 27 used in the construction of the transformer is provided with ventilating holes 28 to provide ventilation for the rear side of the transformer. It is to be further noted that the arrangement of the cables on the right-hand side of Figure 3 is different from that shown in Figure 1, and is merely for the purpose of showing that the "knock-out" portions 14 may be arranged in any desired manner or number.

From what has been said, it will be seen that at a slightly extra cost, due to the extension of the channel members 3 and 4 and the closure plates, I have attained all of the advantages heretofore referred to. In addition, it will be seen that the modification shown in Figure 7 may be readily applied to the transformer, whereas, if a separate junction box is used, provision must be made on the junction box for the switch, and in addition, all of the various taps must be carried from the transformer to the junction box wherever located, which in any event, would mean extra trouble and cost.

What I claim is:

1. In a transformer having a laminated core and windings thereon, and frame members on opposite sides of the core for holding the core laminations in position; means for obtaining an integral, built-in junction box for the transformer including, extensions of the frame members on one side, and at one end, a support for the conductors coming from the transformer windings, said support being fastened to said extensions preferably a short distance from their beginning, a closure plate across the ends of said extensions, a back closure plate extending the entire length of said frame members having the extensions, a removable plate fitting over the front of said extensions completing the junction box, certain of the walls of the junction box being provided with means for bringing in the cables.

2. A transformer built-in junction box as defined in claim 1, further characterized in that said conductor support is equipped with binding posts for connecting the conductors thereto.

3. For an air-cooled transformer having a core, windings and frame members, a built-in junction box, including extensions at one end of the rear frame members, a back closure plate extending between said rear frame members and extensions, an end closure plate for said extensions, a removable plate fitting on the front of said extensions completing the junction box, a conductor and cable support plate within the box extending transversely between said extensions, and means permitting the cables to be brought into the box from the top, back and side thereof for connection to the conductors coming from the transformer windings.

4. A built-in junction box for a transformer as defined in claim 3, further characterized in that the said support plate is equipped with binding posts for connecting the conductors thereto.

5. For a transformer, an integral closed junction box, including frame members extended upwardly beyond the transformer per se at one side of the transformer to form the sides of the box, a back closure plate, an end closure plate and a front removable plate, a conductor support plate within the box and held by the said side extended members, and means comprising openings in the end plate, the back plate or the side members for bringing the connecting cables into the box for union with the transformer conductors.

6. In a transformer having frame members on opposite sides of the core; a built-in junction box including extensions at one end of the frame members on one side of the transformer, back and end closure plates for said extensions, a removable plate fitting on the front of said extensions completing the junction box, certain of the walls of the junction box being provided with means for bringing in conductors, and means carried by at least some parts of the junction box for receiving the conductors coming from the transformer and from the outside.

ANDREW A. EMLEN.